United States Patent
Cain

(10) Patent No.: US 12,204,582 B2
(45) Date of Patent: Jan. 21, 2025

(54) MEDIA FILE SYSTEMS AND METHODS OF STORING MEDIA FILES IN A MEDIA FILE SYSTEM

(71) Applicant: Grass Valley Limited, Newbury (GB)

(72) Inventor: James Westland Cain, Berkshire (GB)

(73) Assignee: GRASS VALLEY LIMITED, Newbury (GB)

( * ) Notice: Subject to any disclaimer, the term of this patent is extended or adjusted under 35 U.S.C. 154(b) by 82 days.

(21) Appl. No.: 18/307,632

(22) Filed: Apr. 26, 2023

(65) Prior Publication Data

US 2023/0385332 A1    Nov. 30, 2023

Related U.S. Application Data

(63) Continuation of application No. 17/446,803, filed on Sep. 2, 2021, now Pat. No. 11,669,563, which is a (Continued)

(30) Foreign Application Priority Data

Apr. 15, 2016    (GB) .................................... 1606595

(51) Int. Cl.
*G06F 16/00*    (2019.01)
*G06F 16/40*    (2019.01)
(Continued)

(52) U.S. Cl.
CPC .............. *G06F 16/48* (2019.01); *G06F 16/40* (2019.01); *G06F 16/739* (2019.01); *G06F 16/9024* (2019.01)

(58) Field of Classification Search
CPC ........ G06F 16/48; G06F 16/40; G06F 16/739; G06F 16/9024
See application file for complete search history.

(56) References Cited

U.S. PATENT DOCUMENTS 11,157,521 B2 * 10/2021 Guzik ................... G06F 16/435
2004/0001106 A1    1/2004 Deutscher
(Continued)

FOREIGN PATENT DOCUMENTS

| GB | 2505654 A | 3/2014 |
| WO | 2014/037698 A1 | 3/2014 |

OTHER PUBLICATIONS

Bohm et al., "Metadata for Multimedia Documents", Sigmod Record, vol. 23, No. 4, Dec. 1994, pp. 21-26.
(Continued)

*Primary Examiner* — Cheryl Lewis
(74) *Attorney, Agent, or Firm* — ARENTFOX SCHIFF LLP

(57) ABSTRACT

A media file system, apparatus, computer program product and method are provided for storing a file relationship graph and media data files. An exemplary method includes obtaining a new media file and determining the one or more portions of essence data from which the new media file is derived. The method further including generating a new materials data file for the new media file indicating the determined one or more portions of essence data. Moreover, storing the new materials data file in the media file system, and updating the file relationship graph using the new materials data file.

19 Claims, 7 Drawing Sheets

Related U.S. Application Data continuation of application No. 16/159,063, filed on Oct. 12, 2018, now Pat. No. 11,157,545, which is a continuation of application No. PCT/GB2017/051053, filed on Apr. 13, 2017.

(51) Int. Cl.
*G06F 16/48* (2019.01)
*G06F 16/738* (2019.01)
*G06F 16/901* (2019.01)

(56) References Cited

U.S. PATENT DOCUMENTS

| | | |
|---|---|---|
| 2004/0189704 A1 | 9/2004 | Walsh et al. |
| 2007/0078896 A1* | 4/2007 | Hayashi ................ G06F 16/48 |
| 2007/0078898 A1 | 4/2007 | Hayashi et al. |
| 2007/0255727 A1 | 11/2007 | Hirose et al. |
| 2009/0106639 A1 | 4/2009 | Blinnikka |
| 2009/0217352 A1 | 8/2009 | Shen et al. |
| 2010/0262618 A1 | 10/2010 | Hedinsson et al. |
| 2011/0161348 A1 | 6/2011 | Oron |
| 2014/0297810 A1* | 10/2014 | Zhong ................... H04L 65/612 709/219 |
| 2018/0349368 A1* | 12/2018 | Bellingham ......... H04N 21/858 |
| 2020/0334715 A1* | 10/2020 | Shi-Nash ................ G06N 5/04 |

OTHER PUBLICATIONS

Garcia et al., "Semantic Integration and Retrieval of Multimedia Metadata", SEMAnnot@ ISWC 2005, pp. 69-80.
International Search Report and Written Opinion dated Aug. 2, 2017 from corresponding PCT Application No. PCT/GB2017/051053.

* cited by examiner

MEDIA FILE SYSTEMS AND METHODS OF STORING MEDIA FILES IN A MEDIA FILE SYSTEM

CROSS REFERENCE TO RELATED APPLICATIONS

The present application is a continuation of U.S. patent application Ser. No. 17/446,803, filed Sep. 2, 2021, now U.S. Pat. No. 11,669,563, which is a continuation of U.S. patent application Ser. No. 16/159,063, filed Oct. 12, 2018, now issued as U.S. Pat. No. 11,157,545, which is a continuation of PCT/GB2017/051053 filed Apr. 13, 2017, which claims priority to GB Patent Application No. 1606595.5, filed Apr. 15, 2016, the entire contents of each of which are incorporated herein by reference.

FIELD OF THE INVENTION

The present invention concerns media file systems and methods of storing media files in a media file system. More particularly, but not exclusively, the present invention concerns storing media files in a media file system with associated materials data files and a file relationship graph.

Background of the Invention

A known media file system is shown in FIG. 1. The media file system 1 comprises a data store 2, a file record database 3, and a gateway 4. The data store 2 stores media data, in other words video and audio data, conventionally known as "essence" data. The file record database 3 contains file records that store the details of the files stored in the media file system 1, in particular the location of the essence data in the data store 2 that constitutes the files, but also other metadata such as creation date, file length, permission information and other attributes.

Access to the media file system 1 is provided by the gateway 4, which is connected via a network 5 to external devices 6, such as servers, personal computers (PCs) and the like. The network 5 may be a local area network (LAN) or a public network such as the Internet. The gateway 6 accepts requests to read/write media files from/to the media file system 1, for example, and in response reads/writes data from/to the data store 2 based on the file records in the file record database 3; similarly, the file system gateway 4 accepts requests to read/write to the file records in the file record database 3 itself.

In particular, the gateway 6 provides file data for the media files from the essence data in the data store 2, with the file records in the file record database 3 defining which essence data should be used.

The data for a media file in the media file system 1 may simply be a single block of essence data in the data store 2, in which case the file record for the media file in the file record database 3 simply contains details of the relevant block of essence data. Often, a media file will consist of a block of video essence data and a corresponding block of audio essence data providing a soundtrack to the video, in which case the corresponding file record contains details of both blocks of essence data.

A media file in the media file system 1 may also be a "clip", as shown in FIG. 2. Clips are new media files that are created from media files already stored within the file system 1, and so use essence data already stored in the data store 2. Clips are conventionally created by video editing software. The clip X of FIG. 2 consists of sections A', B' and C' from blocks of essence data for media files A, B and C respectively. Usually such a clip would also comprise a soundtrack comprised of a single block of audio essence data.

An advantage of a media file in the media file system 1 being created as a clip is that its file record in the file record database 3 does not need to contain details of a single unique block of essence data in the data store 2 that contains the file data for the file. Instead, the file record can contain details of the sections of the blocks of pre-existing essence data that make up the clip. This means that no additional essence data needs to be stored in the data store 2 for the new file, the file record can simply point to existing essence data. However, to a device 6 interacting with the gateway 6 the new media file will appear the same as any other file, in the sense that the file data for the media file will be returned as if it were a single block of essence data.

The file record for the media file may contain metadata identifying the file as a clip, and describing how it was created. Such a description is sometimes referred to as an Edit Decision List (EDL). Various standardised formats for this metadata exist, such as Advanced Authoring Format (AAF) and XML Interchange Format (XMEML). The file record may contain other metadata such as copyright information and descriptive information about the file and its contents.

A more complicated clip is shown in FIG. 3. In this case, the clip Y consists of sections D' and E' from blocks of essence data for files D and E respectively. Between the sections D' and E' is a block of essence data for a media file F. The media file F was generated from sections D" and E" from media files D and E respectively, and is a fade from D" into E" generated by video editing software. Thus, the clip Y when viewed appears to be the sections D' and D" from file D, faded into the sections E" and E' from file E.

It is important to note that while the block of essence data for the media file F is derived from essence data already in the file store 1, it is itself a separate block of essence data in the file store 1. This is because the frames of video it contains are not present in either of the original blocks of essence data from which it is derived. New essence data may be generated in many other ways during the creation of a clip, for example a visual filter can be applied or graphical elements such as idents, headlines, news tickers and the like can be added to a section of video essence data. As another example, new essence data may be derived by having a first piece of video as part of a second piece of video, for example in a clip of a newsreader with footage showing on the screen over their shoulder. In the case of audio, new audio essence data may be generated by overlaying tracks (for example a voiceover combined with background music) or by varying the characteristics such as the volume of an audio track.

It is often desirable to be able to answer queries that depend upon the relationships between media files, in particular where they depend on the essence data from which they are derived. For example, the essence data may constitute a piece of footage which is subject to copyright and used in television programmes under license. In this case, there may be a need to identify where the footage is used to ensure that the terms of the license are being complied with. In particular, it may be necessary to identify where footage is used in a media file even if it is not the original essence data that constituted the footage that is being used in that media file, for example if the footage is being displayed over a newsreader's shoulder thus leading to new essence data being used in the media file. It may be further be necessary to identify the amount of footage used, for example a license may be given to use at most 2 minutes of live footage from a sporting event. Similarly, it may be necessary to identify where music is used in a television programme, even though the music is mixed together with other audio such as a voiceover.

Conventionally, this identification is done by a person viewing the clips, for example a broadcast television programme, visually/aurally identifying any relevant copyright material in the programme, and manually making a record. This is extremely time intensive, and can be unreliable as the person may fail to identify material used.

In editing software, functionality is known that allows a user to jump from a particular frame in a clip to the same frame in the media file from which the frame was obtained (a "backward" jump). This functionality is usually known as "Match Frame". In some known media file systems the frames of essence data are given a unique ID (a GUID), and this GUID can be used to identify the essence data from which the frame derives. In other known media file systems, the original media file in which the frames are present can be determined from its path in the media file system.

Further, functionality is known that allows a user creating a clip from a media file to jump from a frame in that media file to the same frame in the clip (assuming that frame is present in the clip), in other in the opposite direction to Match Frame (a "forward" jump). Accordingly, this functionality is known as "Reverse Match Frame".

However, it can be seen that while related to the above-mentioned problem, Match Frame and Reverse Match Frame do not provide a solution. Further, Match Frame can only jump from a frame in a clip to the same frame in the original media file, so will not work if the frame has been modified, for example due to a fade being made between sections of video. Reverse Match Frame is only able to identify where within a known clip currently being edited a frame from original file is located, and does not provide general functionality to identify any clips containing the frame.

The present invention seeks to mitigate the above-mentioned problems. Alternatively and/or additionally, the present invention seeks to provide improved methods of storing media files in a media file system, improved methods of answering a query regarding relationships between media files stored in a media file system, improved methods of exporting media files stored in a media file system, and improved media file systems.

SUMMARY OF THE INVENTION

In accordance with a first aspect of the invention there is provided a method of storing media files in a media file system, wherein:
  a set of media files in the media file systems are each derived from one or more portions of essence data;
  each media file in the set of media files has associated it a materials data file, the materials data file indicating the one or more portions of essence data from which the media file is derived; and
  the media file system comprises a file relationship graph indicating how the media files in the set of media files are related by their essence data;
  the method comprising the steps of:
  obtaining a new media file;
  determining the one or more portions of essence data from which the new media file is derived;
  generating a new materials data file for the new media file indicating the determined one or more portions of essence data;
  storing the new materials data file in the media file system; and
  updating the file relationship graph using the new materials data file.

In this way, the file relationship graph can be generated and updated from the materials data files associated with the media files stored in the media file system. The file relationship graph is then available to easily and quickly allow queries that depend upon the relationships between the media files in the media file system.

The new media file may be sent to the media file system for storing in the media file system, and the method further comprise the step of storing the new media file in the media file system. In this way, each media file has an associated materials data file, and the file relationship graph of the media file system is kept up-to-date. Alternatively, the method may be applied iteratively to a media file system storing media files that do not have associated materials data files and that does not have a file relationship graph, so as to generate the associated materials data files and file relationship graph.

Preferably, the new materials data file is an XML file. However, other formats may be used.

Preferably, the portions of essence data are indicated in the new materials data file using unique IDs. The unique IDs may be GUIDs for the original "rushes" of essence data. Preferably, the new materials data file further indicates the time period of essence data used. The new materials data file may further indicate other information about the essence data used, for example the type of the essence data, the sample rate and the like.

The one or more portions of essence data from which the new media file is derived may be determined using the file relationship graph Where the new media file is a clip, advantageously the one or more portions of essence data from which the new media file is derived are determined using metadata associated with the new media file indicating how the clip was created. The metadata may be in AAF or XMEML format, for example. By considering the metadata indicating how the clip was created, the essence data from which the media file was derived can be determined even if the essence data was modified during creation of the clip. Further, other information from the metadata can be used to more accurately determine whether the essence data was in fact used to derive the media file. For example, the metadata can be used to determine which particular segments of a block essence data were used to derive the media file. Similarly, essence data may have been used during the creation process in such a way that its content is not in fact present in the media file. For example, audio data may have been present only at zero volume level, or video data may have been used completely faded out. Further, as it is common for editing software to generate metadata of this type when a clip is created, this allows the method to be used on legacy media file system in which media files have been stored without any materials data files or file relationship graph.

Preferably, the nodes of the file relationship graph are the media files in the set of media files, and there is an edge between nodes in the file relationship graph if the media files corresponding to the nodes are derived from at least some of the same essence data. In this case, updating the file relationship graph means adding a node for the new media file and the required edges. The edges of the file relationship graph may further indicate additional information about extent to which essence data is shared, for example the time period of essence data that is shared.

In accordance with a second aspect of the invention there is provided a method of answering a query regarding relationships between media files stored in a media file system in accordance with any of the methods described above, wherein the query is answered using the file relationship graph of the media file system. In this way, such queries can quickly and easily be answered. Queries may include, but are not limited to, queries about where particular essence data has been used (i.e. in which media files), which sources of essence data were used when creating a clip, and the like. In combination with other data sources such as third-party data sources, queries may include, but are not limited to, queries about whether a media file can be used (e.g. does it contain embargoed or otherwise forbidden content), where a media file can be used (e.g. on the Internet as well as broadcast), what parties have rights over the content in a media file, how much will it cost to broadcast a media file, whether the media file can be edited to make it cheaper to broadcast, and the like.

In accordance with a third aspect of the invention there is provided a method of exporting a media file stored in a media file system in accordance with any of the methods described above, wherein the materials data file associated with the media file is exported with the media file. In this way, information about the essence data from which the media file is derived is not lost when the media file is exported, even though the media file may be exported as a "flat file", i.e. as an unstructured media file in a format that does not itself contain such information.

In accordance with a fourth aspect of the invention there is provided a media file system arranged to store media file in accordance with any of the methods described above.

In accordance with a fifth aspect of the invention there is provided a media file system arranged to answering queries regarding relationships between media files stored in the media file system in accordance with the method described above.

In accordance with a sixth aspect of the invention there is provided a media file system arranged to exporting a media file stored in a media file system in accordance with the method described above.

In accordance with a seventh aspect of the invention there is provided a computer program product arranged, when executed, to perform any of the methods described above.

In accordance with an eighth aspect of the invention there is provided a computer program product arranged, when executed, to provide any of the media file systems described above.

It will of course be appreciated that features described in relation to one aspect of the present invention may be incorporated into other aspects of the present invention. For example, the method of the invention may incorporate any of the features described with reference to the apparatus of the invention and vice versa.

The present disclosure provides a media file system comprising a file relationship graph and a data store, the data store configured to store media data files, the media file system configured to:
  receive a request to identify the media files stored in the data store that include at least a portion of desired essence data;
  identify, using the file relationship graph media data files stored in the data store and comprising at least a portion of desired essence data; and
  provide data indicating the identified data files.

The request may comprise data identifying the desired essence data. For example the request may comprise the desired essence data. The request may be carried by a message, which may be received over a network.

The file relationship graph may comprise a plurality of nodes, and a plurality of edges.

It will be appreciated in the context of the present disclosure that a file relationship graph may be provided by a data structure comprising data defining the nodes and edges of that graph.

The nodes may each provide a representation of a corresponding one of a plurality of media data files, e.g. the media data files stored in the data store. For example, each node may comprise data identifying a corresponding media data file.

The edges may each comprise data indicating a relationship between two nodes, e.g. indicating a relationship between media data files. For example, a relationship between media data files may be represented by an edge "connecting" the nodes which represent those media data files.

The presence of an edge linking two files may indicate that those two files share some essence data. That is to say, an edge may indicate that at least a portion of the essence data present in a first file identified by the edge is based on essence data present in a second file identified by the edge. This may mean that the first file actually comprises essence data which is also in the second file, or it may mean that essence data in the first file has been derived from essence data in the second file. The edge may also comprise data indicating the essence data which is shared between the two nodes linked by that edge.

The media file system may be configured to identify a node which comprises the desired essence data, and then to identify at least one edge connected that node and indicating another node which comprises the desired essence data. The media file system may then use that edge to identify another (e.g. a next, or nearest neighbour) node which comprises the desired essence data. At that next node, the media file system may identify the edges which link to that node, and which of those edges indicate the presence of the desired data in another node. By repeated application of this process, the media file system may traverse the file relationship graph identifying each of the nodes which comprise the desired essence data.

The media file system may thus identify edges connect to the nearest neighbour nodes to the desired node. In some examples this allows the nearest neighbour nodes to be identified.

The determination using the file relationship graph may be performed through the use of an algorithm such as a depth first search, or a breadth first search. Such algorithms may be implemented in any database query language, such as Structured Query Language (SQL) system.

DESCRIPTION OF THE DRAWINGS

Embodiments of the present invention will now be described by way of example only with reference to the accompanying schematic drawings of which.

DETAILED DESCRIPTION

Figure 1:
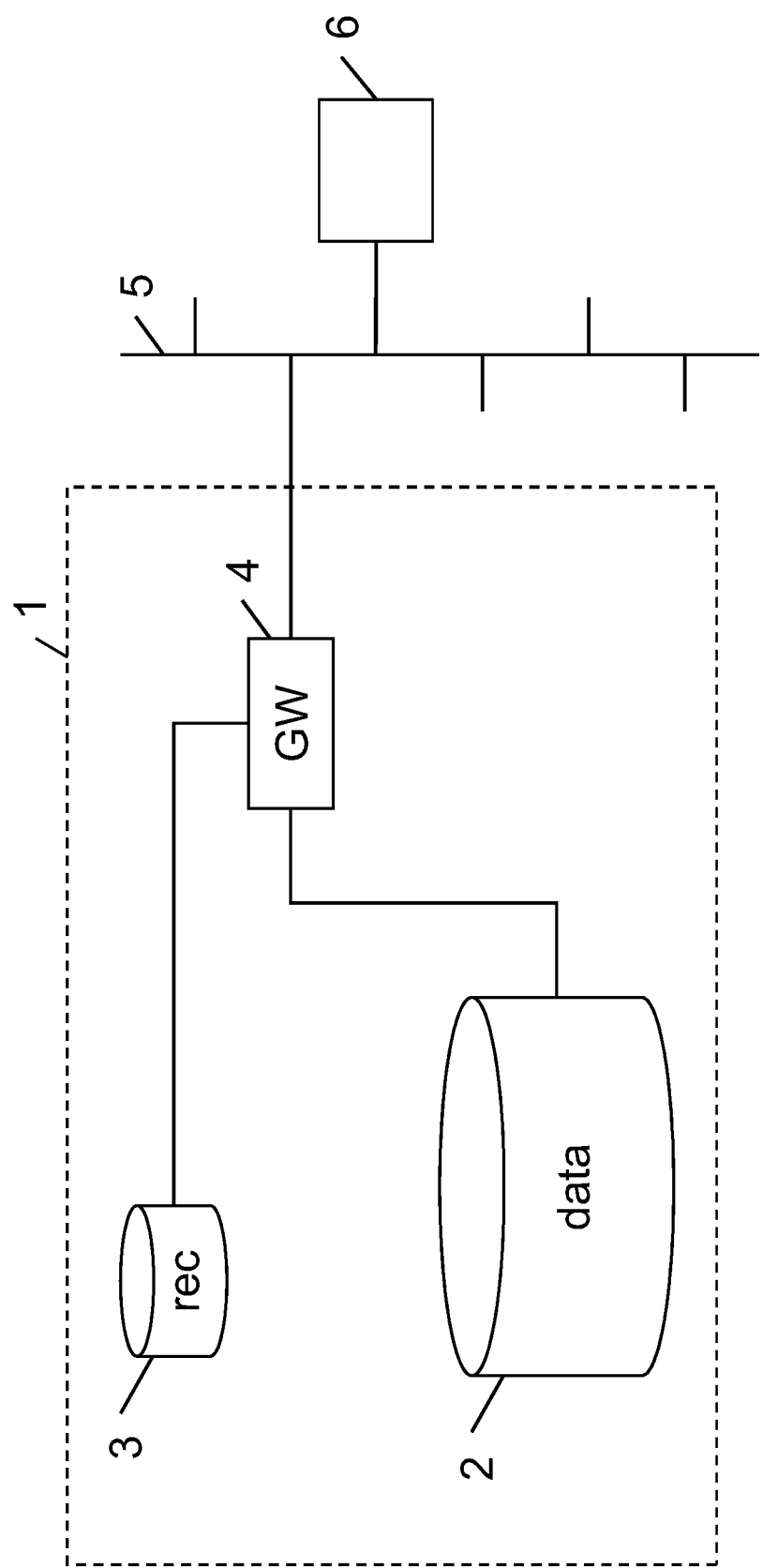
FIG. 1 is a known media file system.
Figure 2:
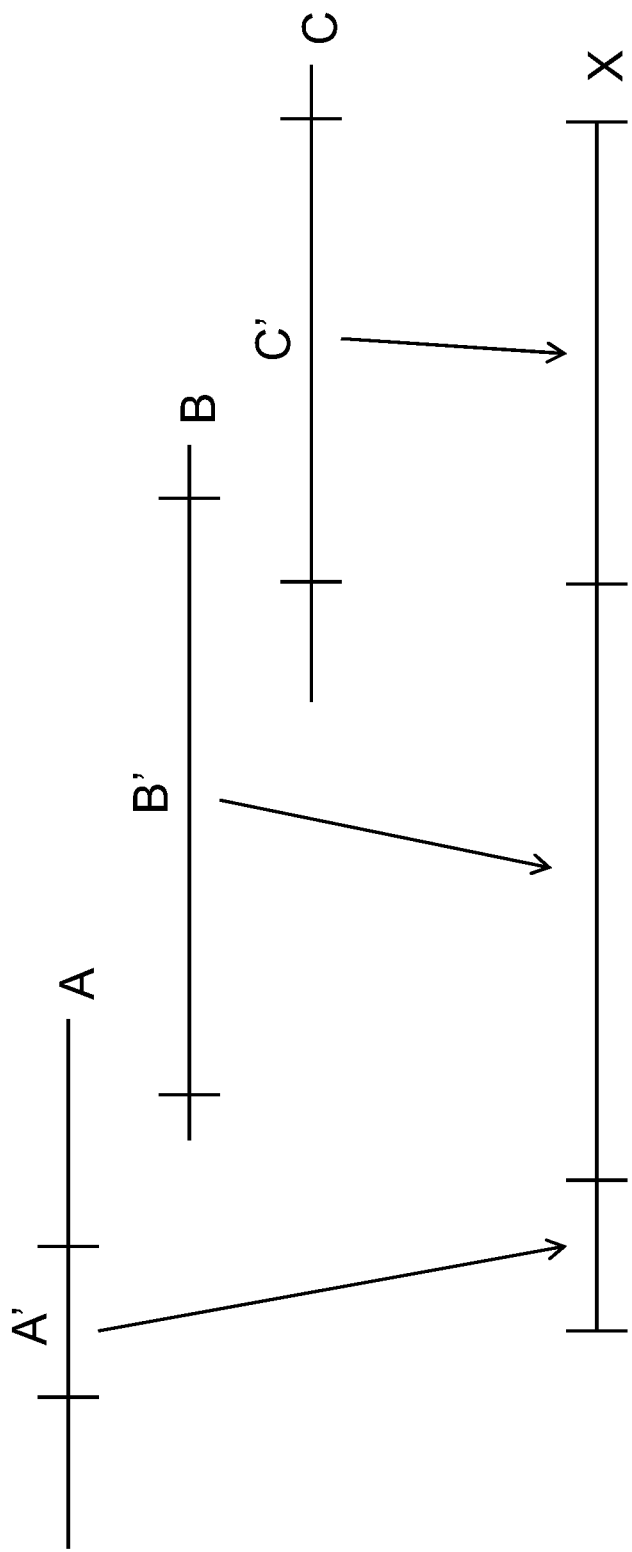
FIG. 2 is a diagram of a first clip in the media file system of FIG. 1.
Figure 3:
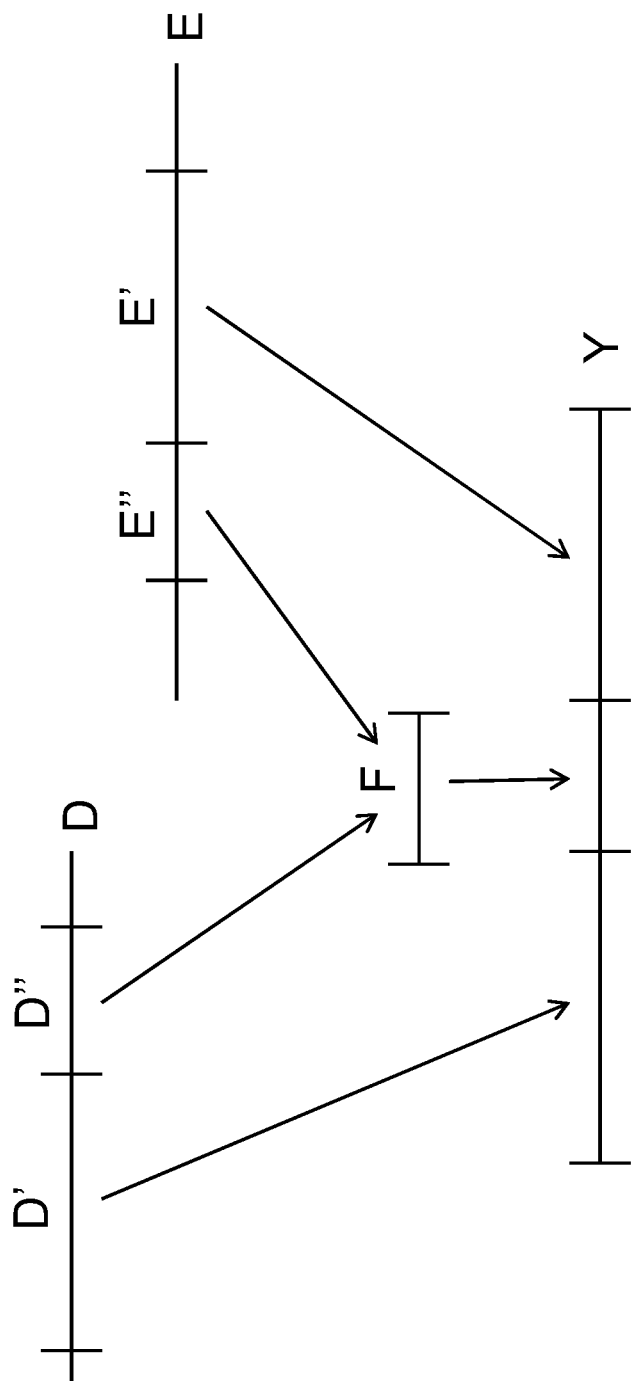
FIG. 3 is a diagram of a second clip in the media file system of FIG. 1.

A first embodiment of the invention is now described with reference to FIGS. 4 to 6. The embodiment operates in a media file system of the type shown in FIG. 1. However, alternative embodiments of the invention can operate in file systems of other types.

The media file system 1 stores in the file record database 3 a materials data file associated with each media file stored in the media file system 1. Each materials data file is an XML file that indicates the essence data from which its associated media file is derived, as described in detail below.

Figure 4:
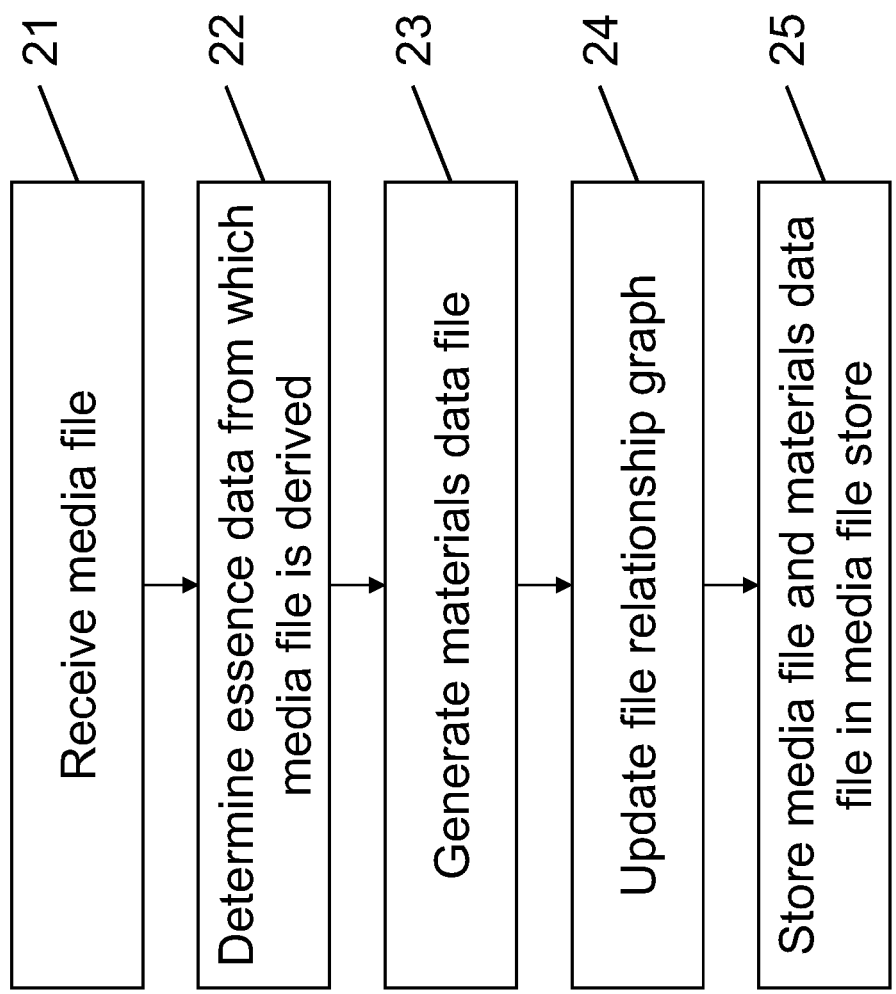
FIG. 4 is a flow chart describing the operation of a media file system in accordance with a first embodiment of the invention, when a new media file is added to the media file system.

FIG. 4 is a flow chart describing the operation of the media file system when a new media file is added to the media file system. In the present example, assume that the media file system 1 has stored in it the media files A, B, C, X, D, E and F as described above, as well as a sound media file S. As these media files are already stored in the media file system 1, they have associated materials data files stored in the file record database 3. The materials data file for media file A is as follows:

```
<bom>
  <track>
    <segment>
      <rush>RA</rush>
      <start>0</start>
      <length>35</length>
      <name>A</name>
      <type>video</type>
      <size>1920:1080</size>
      <pixelAspect>1:1</pixelAspect>
      <format>AVC-Intra Class 100 1080i</format>
      <sampleRate>25/1</sampleRate>
      <transition>false</transition>
    </segment>
  </track>
</bom>
```

Materials Data File for File A

As can be seen, this indicates that media file A has a single segment derived from a single rush of essence data with ID RA (it will be appreciated that in practice this would be a GUID of the form {7260ad00-8e5d-4536-834a-9d00ef29423e} or the like), which starts at position 0 and is of length 35.

Similarly, the materials data files for media files B and C are as follows:

```
<bom>
  <track>
    <segment>
      <rush>RB</rush>
      <start>0</start>
      <length>50</length>
      <name>B</name>
      <type>video</type>
      <size>1920:1080</size>
      <pixelAspect>1:1</pixelAspect>
      <format>AVC-Intra Class 100 1080i</format>
      <sampleRate>25/1</sampleRate>
      <transition>false</transition>
    </segment>
  </track>
</bom>
```

Materials Data File for File B

```
<bom>
  <track>
    <segment>
      <rush>RC</rush>
      <start>0</start>
      <length>45</length>
      <name>C</name>
      <type>video</type>
      <size>1920:1080</size>
      <pixelAspect>1:1</pixelAspect>
      <format>AVC-Intra Class 100 1080i</format>
      <sampleRate>25/1</sampleRate>
      <transition>false</transition>
    </segment>
  </track>
</bom>
```

Materials Data File for File C

These indicate that media file B is has a single segment derived from a single rush of essence data with ID RB, which starts at position 0 and is of length 50; and media file C is has a single segment derived from a single rush of essence data with ID RC, which starts at position 0 and is of length 45.

The media file X generated from the media files A, B and C then has the following materials data file:

```
<bom>
  <track>
    <segment>
      <rush>RA</rush>
      <start>15</start>
      <length>10</length>
      <name>A'</name>
      <type>video</type>
      <size>1920:1080</size>
      <pixelAspect>1:1</pixelAspect>
      <format>AVC-Intra Class 100 1080i</format>
      <sampleRate>25/1</sampleRate>
      <transition>false</transition>
    </segment>
    <segment>
      <rush>RB</rush>
      <start>5</start>
      <length>40</length>
      <name>B'</name>
      <type>video</type>
      <size>1920:1080</size>
      <pixelAspect>1:1</pixelAspect>
      <format>AVC-Intra Class 100 1080i</format>
      <sampleRate>25/1</sampleRate>
      <transition>false</transition>
    </segment>
    <segment>
      <rush>RC</rush>
      <start>10</start>
      <length>30</length>
      <name>C'</name>
      <type>video</type>
      <size>1920:1080</size>
      <pixelAspect>1:1</pixelAspect>
      <format>AVC-Intra Class 100 1080i</format>
```

```
      <sampleRate>25/1</sampleRate>
      <transition>false</transition>
    </segment>
  </track>
</bom>
```

Materials Data File for File X

This indicates that the media file X has three segments, derived from portions of the essence data RA (starting at position 15 and of length 10), RB (starting at position 5 and of length 40) and RC (starting at position 10 and of length 30).

It will be appreciated that media files D, E and S have materials data files similar to those for media files A, B and C above. Media file F then has a materials data file as follows:

```
<bom>
  <track>
    <segment>
      <rush>RD</rush>
      <start>25</start>
      <length>10</length>
      <name>D' '</name>
      <type>video</type>
      <size>1920:1080</size>
      <pixelAspect>1:1</pixelAspect>
      <format>AVC-Intra Class 100 1080i</format>
      <sampleRate>25/1</sampleRate>
      <transition>false</transition>
      <layer>
        <name>E' '</name>
        <rush>RE</rush>
        <start>10</start>
        <length>10</length>
      </layer>
    </segment>
  </track>
</bom>
```

Materials Data File for File F

In this case, the materials data file indicates that media file F consists of a single segment, but that the single segment is derived from two portions of essence data, a portion D" coming from media file D (and ultimately from essence data RD), and in addition a portion E" coming from media file E (and ultimately from essence data RE) in an additional layer of the segment. This reflects that both these portions of essence data were used to create the media file F, because as described above it is a fade from one to the other. However, notably the materials data file indicates only the essence data used (along with certain properties), but does not describe how the media file F was created, in other words that it is a fade and any other effects that may have been used.

Figure 5A:
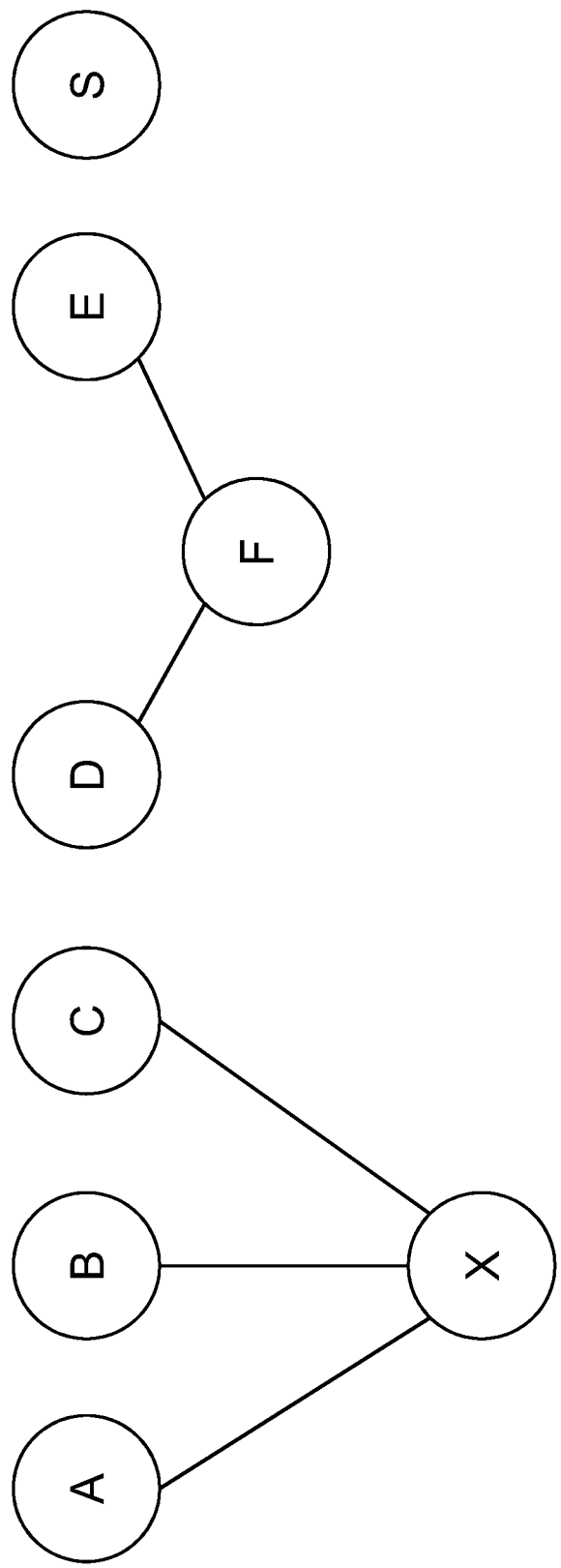
FIG. 5a is a file relationship graph of the media file store of FIG. 4.

FIG. 5a shows the file relationship graph stored in the file record database 3 of the media file system 1, when the media file system 1 contains the media files A, B, C, X, D, E, F and S. As can be seen, the media files give the nodes of the graph. There are edges between the media file X and each of the media files A, B and C, indicating that media file X shares essence data with each of the media files A, B and C. Similarly, edges between the media file X and each of the media files D and E indicate that it shares essence data with each of those media files. Finally, no media files share any (audio) essence data with media file S, so it is not connected to any other media files by any edges.

It will be appreciated that there will be many different ways by which the file relationship graph can be recorded and stored in the media file system 1 that will be apparent to the skilled person.

The addition of the media file Y to the media file system 1 is now described, with reference to the flowchart of FIG. 4. As described above, the media file Y is a clip obtained by combining the media files D, E and F. In addition, in the present example the media file Y has an audio layer provided by the media file S.

First, the media file system 1 receives the media file Y for storage, for example from editing software (step 21). The media file system 1 then determines the essence data from which the media file Y is derived (step 22). As the media file Y is a clip, this can be determined using the metadata from the editing software describing how it was created. It will be appreciated that there are various methods by which the materials data file can be generated, and WO2014/037698A1 published 13 Mar. 2014, for example, describes methods by which the essence data from which a media file is derived can be determined. Further, it will be appreciated that the materials data files for the media files D, E, F and S, which already exist in the media file system 1, can be used as they indicate the essence data from which those files are derived.

Once the essence data has been derived, the materials data file for the media file Y is generated (step 23). The materials data file is as follows:

```
<bom>
  <track>
    <segment>
      <rush>RD</rush>
      <start>5</start>
      <length>20</length>
      <name>D'</name>
      <type>video</type>
      <size>1920:1080</size>
      <pixelAspect>1:1</pixelAspect>
      <format>AVC-Intra Class 100 1080i</format>
      <sampleRate>25/1</sampleRate>
      <transition>false</transition>
    </segment>
    <segment>
      <rush>RD</rush>
      <start>25</start>
      <length>10</length>
      <name>D' '</name>
      <type>video</type>
      <size>1920:1080</size>
      <pixelAspect>1:1</pixelAspect>
      <format>AVC-Intra Class 100 1080i</format>
      <sampleRate>25/1</sampleRate>
      <transition>false</transition>
      <layer>
        <name>E' '</name>
        <rush>RE</rush>
        <start>10</start>
        <length>10</length>
      </layer>
    </segment>
    <segment>
      <rush>RE</rush>
      <start>20</start>
      <length>20</length>
      <name>E' '</name>
      <type>video</type>
      <size>1920:1080</size>
      <pixelAspect>1:1</pixelAspect>
      <format>AVC-Intra Class 100 1080i</format>
      <sampleRate>25/1</sampleRate>
      <transition>false</transition>
    </segment>
  </track>
  <track>
    <segment>
      <rush>RS</rush>
      <start>0</start>
      <length>96000</length>
```

```
    <name>S</name>
    <type>audio</type>
    <sampleRate>48000/1</sampleRate>
    <transition>false</transition>
  </segment>
 </track>
</bom>
```

Materials Data File for File Y

As can be seen, this indicates that media file Y has three segments, a first derived from the essence data RD underlying media file D, a second derived the essence data RD and RE underlying both media files D and E, and a third coming from the essence data RE underlying media file E. Further, the media file has an additional track with a single segment derived from the essence data RS underlying the media file S. This is due to the audio track for media file Y, and it can be seen that the type of the segment is audio rather than video, and the other properties of the segment (e.g. length, sample rate) are correspondingly different as required by this different type.

Figure 5B:
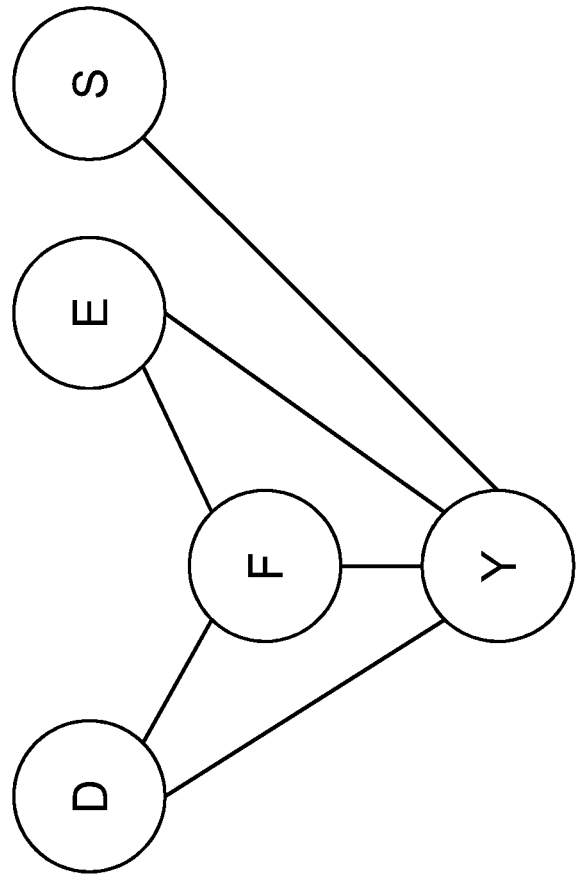
FIG. 5b is the file relationship graph of FIG. 5a when updated.
Figure 5B:
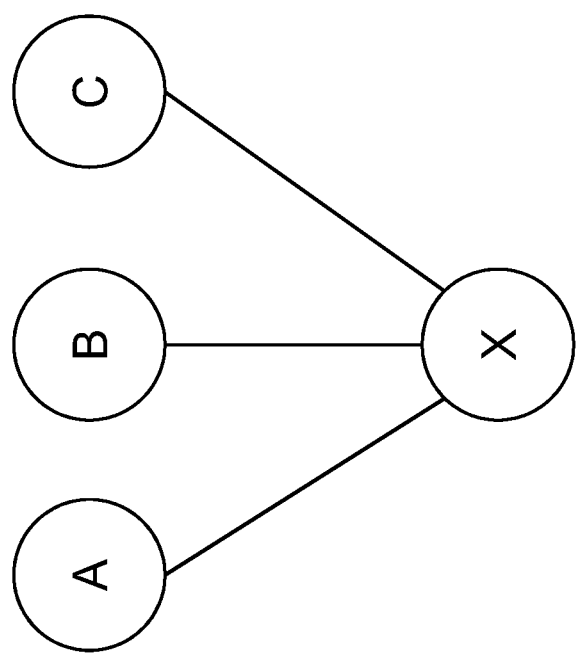

Next, the file relationship graph is updated (step 24), to include a new node for the media file Y and any required edges. The updated file relationship graph is shown in FIG. 5b. As can be seen, the media file Y is connected by edges to the media files D, E, F and S, to indicate that it shares essence data with those media files. It will be appreciated that this can be determined using the materials data files, and in particular an edge is added between two media files if their materials data files indicate that they are both derived from the same portion of essence data. (They may be both derived from multiple of the same portions of essence data, of course.)

Finally, the media file Y and its generated materials data file are stored in the media file system 1 (step 25).

In the present embodiment, an edge is added between media files in the file relationship graph if they are both derived from the same portion (or portions) of essence data. In other embodiments, an edge may be added if the files are derived from the same essence data, even if they are not derived from the same portions of that essence data. For example two files may be derived from essence data RA, but the first is derived from the portion from time 0 to 10, and the second from the portion from time 20 to 30. In other embodiments, other conditions may be used to decide when an edge is added. Further, properties may be added to the edges, for example to indicate the amount of essence data shared or other appropriate properties about the relationship.

In an alternative embodiment of the invention, rather than generating materials data files and updating the file relationship graph only when a media file is added to a media file system, they can be generated for media files already present in an existing media file system, by applying the steps of the flowchart of FIG. 4 to the media files in the media file system in turn. This is possible as it is common for known types of editing software to provide the metadata for each media file that is required for the materials data files to be generated (and then for the file relationship graph to be updated), so that it is available in a media file system even where they have not been intentionally designed to operate in accordance with the present invention (e.g. legacy media file systems).

Media file systems in accordance with embodiments of the invention can be used in various advantageous ways. In a further embodiment of the invention, such a media file system, and in particular the file relationship graph thereof, is used to answer a query that depends upon the relationships between files. Queries may for example be about where particular essence data has been used (i.e. in which media files), which sources of essence data were used when creating a clip, and the like. In addition, third-party data sources may be used, allowing queries to be answered such as whether a media file can be used (e.g. does it contain embargoed or otherwise forbidden content), where a media file can be used (e.g. on the Internet as well as broadcast), what parties have rights over the content in a media file, how much will it cost to broadcast a media file, whether the media file can be edited to make it cheaper to broadcast, and the like. It will be appreciated that various query-answering systems that could be used will be well-known to the skilled person, including but not limited to Structured Query Language (SQL) systems.

A media file system may be configured to identify the media files stored in its data store which include at least a portion of desired essence data. The media file system may be arranged to receive a request to identify media files comprising the desired essence data.

Figure 6:
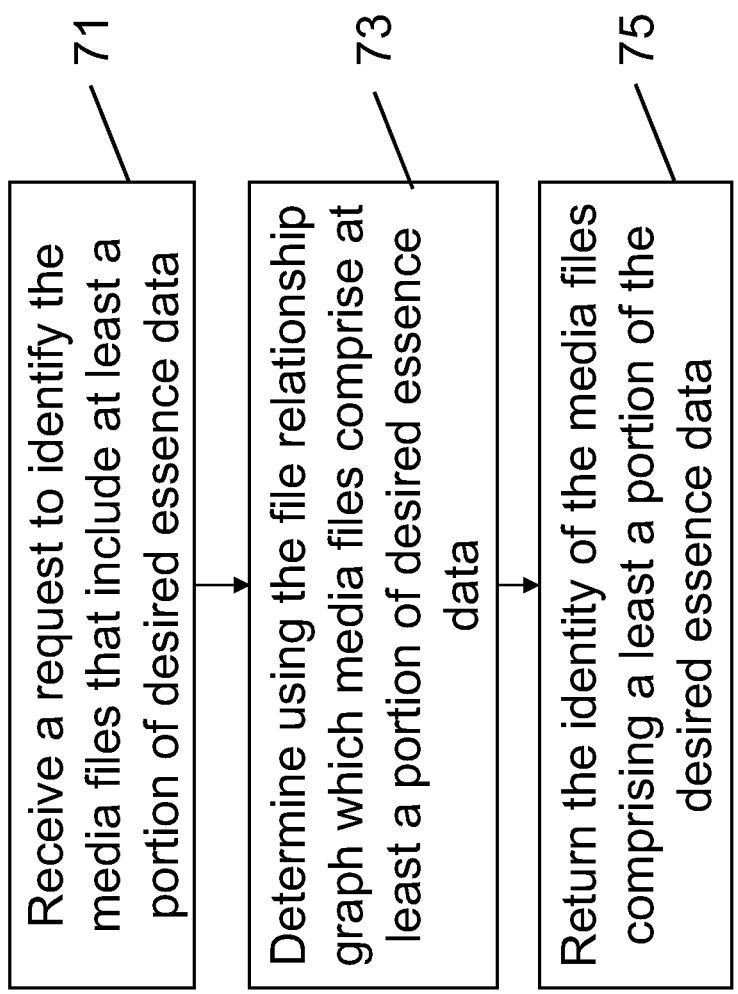
FIG. 6 is a method to identify media data files containing at least a portion of desired essence data.

FIG. 6 is a flow chart which illustrates a method in which the media file system responds to such a request. Apparatus such as that shown in FIG. 1 may be reconfigured to perform the method described with reference to FIG. 6.

As illustrated in FIG. 6, the gateway 4 receives a request to identify the media files. The request comprises an indication of desired essence data. In response to the request, the media file system traverses the file relationship graph to identify the nodes which comprise the desired essence data. This may be done by depth first or breadth first traversal. This enables the media file system to identify which media data files stored in the data store comprise at least a portion of the essence data identified by the request (e.g. desired essence data). The media file system then returns data identifying those media data files.

The gateway 4 may return the identity of the media data files by sending a network message, e.g. to the client which sent the request. It will also be appreciated that the data store 2 may store the media files comprising the essence data, and may store the file relationship graph. The media file system may comprise a programmable processor or other logic arranged to perform this method.

By use of the file relationship graph the media file system may be able to:
 (a) identify the media files which comprise a portion of the essence data specified in a request, or
 (b) to identify the essence data which makes up a media file specified in a request.

As described above, the file relationship graph may also be utilised in a method of storing media files in a media file system.

A client such as a media file device may request media files or information from the media file system. Such devices may be connected to the media file system via the gateway 4 by a network, such as a local area network, or a wide area network. The client application may request information regarding a specified essence data file (e.g. a desired essence data file). This may be information regarding which other files stored in the media file system contain at least a portion of the essence data that is also in the desired file.

The embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. The functionality need not be divided as illustrated in the drawings, and the drawings need not be taken to imply any particular structure of hardware other than that described and claimed herein. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

Any of the activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data storage of the media file system. In some embodiments the gateway comprises a network interface configured to connect the media file system with a client such as a device or application which provides the request for media file data.

Whilst the present invention has been described and illustrated with reference to particular embodiments, it will be appreciated by those of ordinary skill in the art that the invention lends itself to many different variations not specifically illustrated herein.

What is claimed:

1. A media file system for storing media data files, the media file system comprising:
    a media data file manager configured to determine essence from which a new media data file is derived and to update a data structure defining a file relationship graph to include a new node for the new media data file and at least one edge that links the new media data file to at least one existing media data file of a set of media data files that shares the determined essence data from which the new media data file is derived.

2. The media file system according to claim 1, further comprising:
    a file record database configured to store a data structure defining a file relationship graph that includes a plurality of nodes that represent a set of media data files and a plurality of edges that indicate how the media data files are related to each other based on respective essence data in each media data file of the set of media data files.

3. The media file system according to claim 2, wherein the file record database is further configured to store the set of media data, the new media data file, and essence metadata files that indicate the essence data from which each media data file of a set of media data files is derived.

4. The media file system according to claim 1, wherein the media data file manager is further configured to receive a new media file.

5. The media file system according to claim 1, wherein the media data file manager is further configured to generate a new essence metadata file for the new media file that indicates the essence data from which the new media data file is derived.

6. The media file system according to claim 5, further comprising:
    a gateway configured to receive, from a client device, a query to identify a desired media data file of the set of media data files that is derived from a desired essence data.

7. The media file system according to claim 6, wherein the gateway is further configured to respond to the query by returning, to the client device, an identity of the desired media data file that is derived from the desired essence data by traversing the updated data structure using a plurality of edges to identify the respective node and corresponding media data file that is derived from the desired essence data.

8. The media file system according to claim 6, wherein the gateway is further configured to identify the essence data in the new media data file using a unique identification.

9. The media file system according to claim 6, wherein the new media data file is a clip, and the gateway is further configured to determine the essence data from which the new media file is derived using metadata associated with the new media data file indicating how the clip was created.

10. The media file system according to claim 6, wherein the gateway is further configured to export identity desired media data file with the generated new essence metadata file.

11. A method of storing media files in a media file system, the method comprising:
    obtaining, by the media file system, a new media file;
    determining one or more portions of essence data from which the new media file is derived;
    generating a new materials data file for the new media file indicating the determined one or more portions of essence data from which the new media file is derived;
    updating a structure defining a file relationship graph to include a new node for the new media file and at least one edge using the new materials data file, with the at least one edge linking the new media file to at least one media file of a set of media files that shares the determined one or more portions of essence data from which the new media file is derived; and
    storing the new materials data file in a file record database of the media file system.

12. The method according to claim 11, further comprising:
    storing, in the media file system, a set of media files that are each derived from one or more portions of essence data;

storing, in a files record database in the media file system, materials data files associated with each media file, respectively, the materials data files indicating the one or more portions of essence data from which each of the media files is derived; and storing a data structure in the files record database that defines a file relationship graph comprising a plurality of nodes and a plurality of edges, with the plurality of nodes providing a representation of the set of media files and the plurality of edges indicating how the media files in the set of media files are related to each other by their essence data.

13. The method according to claim 12, further comprising:

receiving, from a client device, a request to identify each media file of the set of media files in the media file system that are derived from a desired essence data indicated in the request.

14. The method according to claim 13, further comprising:

returning, to the client device, an identity of the media files that are derived from the desired essence data by traversing the updated data structure using the plurality of edges to identify each node and a corresponding media file that is derived from the desired essence data.

15. The method according to claim 11, wherein the new materials data file is an XML file.

16. The method according to claim 11, further comprising:

identifying the portions of essence data in the new materials data file using unique IDs.

17. The method according to claim 11, further comprising:

determining the one or more portions of essence data from which the new media file is derived using the file relationship graph.

18. The method according to claim 11, wherein the new media file is a clip, and the method further comprises determining the one or more portions of essence data from which the new media file is derived using metadata associated with the new media file indicating how the clip was created.

19. A media file system for storing a file relationship graph and media data files, the media file system comprising:

a file record database configured to store a data structure defining a file relationship graph that includes a plurality of nodes that represent a set of media data files and a plurality of edges that indicate how the media data files are related to each other based on respective essence data in each media data file of the set of media data files;

a processor coupled to the file record database and configured to:

receive a new media data file and determine one or more portions of essence data from which the new media data file is derived, and generate a new materials data file for the new media data file indicating the determined one or more portions of essence data from which the new media data file is derived;

wherein the file record database is configured to store the new materials data file;

wherein the processor is further configured to update the data structure defining the file relationship graph to include a new node for the new media data file and at least one edge using the new materials data file, with the at least one edge linking the new media data file to at least one media data file of the set of media data files that shares the determined one or more portions of essence data from which the new media data files is derived.

* * * * *